(12) United States Patent
Takagi

(10) Patent No.: US 11,441,822 B2
(45) Date of Patent: Sep. 13, 2022

(54) AIR CONDITIONER

(71) Applicant: Daikin Industries, LTD., Osaka (JP)

(72) Inventor: Motoki Takagi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 42 days.

(21) Appl. No.: 16/621,850

(22) PCT Filed: Jul. 26, 2018

(86) PCT No.: PCT/JP2018/028113
§ 371 (c)(1),
(2) Date: Dec. 12, 2019

(87) PCT Pub. No.: WO2019/026766
PCT Pub. Date: Feb. 7, 2019

(65) Prior Publication Data
US 2020/0166233 A1  May 28, 2020

(30) Foreign Application Priority Data
Jul. 31, 2017 (JP) .............................. JP2017-147868

(51) Int. Cl.
*F25B 13/00* (2006.01)
*F24F 11/80* (2018.01)
(Continued)

(52) U.S. Cl.
CPC .............. *F25B 13/00* (2013.01); *F24F 11/46* (2018.01); *F24F 11/49* (2018.01); *F24F 11/58* (2018.01);
(Continued)

(58) Field of Classification Search
CPC .. F24F 11/46; F24F 11/80; F24F 11/74; F24F 11/64; F24F 11/86; F24F 11/49;
(Continued)

(56) References Cited

U.S. PATENT DOCUMENTS

2015/0059380 A1* 3/2015 Takayama ............... F25B 41/22
62/222
2015/0300723 A1* 10/2015 Tsukino ................ F25B 47/025
62/128

FOREIGN PATENT DOCUMENTS

EP  2 833 086 A1  2/2015
EP  2 835 602 A1  2/2015
(Continued)

OTHER PUBLICATIONS

Hara et al., Multiple Air Conditioner, Sep. 7, 2006, JP2006234295A, Whole Document (Year: 2006).*
(Continued)

*Primary Examiner* — Larry L Furdge
(74) *Attorney, Agent, or Firm* — Birch, Stewart, Kolasch & Birch, LLP

(57) ABSTRACT

An air conditioner is provided with a refrigerant circuit that has a first refrigerant path to which a compressor, a first utilization-side heat exchanger, a first expansion valve, and a heat source-side heat exchanger are connected in order. A control unit controls the compressor and the first expansion valve. When the control unit receives a request for high-temperature air that temporarily increases the temperature of the hot air blown out through the first utilization-side heat exchanger, the control unit changes the control of the first expansion valve so that the temperature of a refrigerant that flows through the first utilization-side heat exchanger increases.

9 Claims, 8 Drawing Sheets

(51) Int. Cl.
*F24F 11/74* (2018.01)
*F24F 11/64* (2018.01)
*F24F 11/86* (2018.01)
*F24F 11/46* (2018.01)
*F24F 11/49* (2018.01)
*F24F 11/65* (2018.01)
*F24F 11/58* (2018.01)
*F24F 11/59* (2018.01)
*G05B 15/02* (2006.01)
*F25B 49/02* (2006.01)
*F25B 41/34* (2021.01)
*F25B 41/385* (2021.01)
*F24F 140/60* (2018.01)
*F24F 140/50* (2018.01)

(52) U.S. Cl.
CPC .............. *F24F 11/59* (2018.01); *F24F 11/64* (2018.01); *F24F 11/65* (2018.01); *F24F 11/74* (2018.01); *F24F 11/80* (2018.01); *F24F 11/86* (2018.01); *F25B 41/34* (2021.01); *F25B 41/385* (2021.01); *F25B 49/022* (2013.01); *G05B 15/02* (2013.01); *F24F 2140/50* (2018.01); *F24F 2140/60* (2018.01); *F25B 2600/025* (2013.01)

(58) Field of Classification Search
CPC .. F24F 11/65; F24F 11/58; F24F 11/59; F24F 2140/60; F24F 2140/50; F24F 11/84; F25B 41/31; F25B 49/022; F25B 13/00; F25B 2600/025; F25B 41/385; F25B 49/02; F25B 2313/0233; F25B 2313/0314; F25B 2600/0253; F25B 2313/0315; F25B 2600/111; F25B 2600/112; F25B 2600/19; F25B 2600/2513; F25B 2700/21152; G05B 15/02; Y02B 30/70
See application file for complete search history.

(56) References Cited

FOREIGN PATENT DOCUMENTS

| | | | |
|---|---|---|---|
| EP | 2940395 A1 | | 11/2015 |
| JP | 4-4645 U | | 1/1992 |
| JP | H0828937 A | * | 2/1996 |
| JP | 2001153424 A | * | 6/2001 |
| JP | 2005037003 A | * | 5/2005 |
| JP | 2006234295 A | * | 9/2006 |
| JP | 2009-299914 A | | 12/2009 |
| JP | 2016-114286 A | | 6/2016 |

OTHER PUBLICATIONS

Matsumura et al., Air Conditioner, Jun. 8, 2001, JP2001153424A, Whole Document (Year: 2001).*
Ootori, Air Conditioner, Feb. 2, 1996, JPH0828937A, Whole Document (Year: 1998).*
Kawabe et al., Air Conditioner, Feb. 10, 2005, JP2005037003A, Whole Document (Year: 2005).*
Extended European Search Report, dated Nov. 23, 2020, for European Application No. 18841305.8.

* cited by examiner

AIR CONDITIONER

TECHNICAL FIELD

The present disclosure relates to an air conditioner, and particularly to an air conditioner that has a heating function.

BACKGROUND ART

Conventionally, there has been a case where a person wants to get warm with hot air having a high temperature when entering, from a cold outdoor space, a room where an air conditioner is performing a heating operation. For example, in Patent Literature 1 (JP H4-4645 U), a technique is disclosed in which, when a "high-temperature air blowing mode" is set, that is, when a request to temporarily blow out hot air having a high temperature is made, an operating frequency of a compressor is maximized, and the number of rotations of an indoor-side fan is set to "weak" so that a user does not feel a sense of cold air.

SUMMARY OF THE INVENTION

Technical Problem

However, as described in Patent Literature 1, just maximizing the operating frequency of the compressor and lowering the number of rotations of the indoor-side fan may not make it possible to sufficiently increase the temperature of the hot air to be blown to the user.

Therefore, there is an object to provide an air conditioner that can sufficiently increase the temperature of the hot air when receiving a request for high-temperature air that temporarily increases the temperature of the hot air to be blown out.

Solution to Problem

An air conditioner according to a first aspect includes a refrigerant circuit that has a first refrigerant path to which a compressor, a first utilization-side heat exchanger, a first expansion valve, and a heat source-side heat exchanger are connected in order, and a control unit that controls the compressor and the first expansion valve, in which the control unit changes control of the first expansion valve such that a temperature of a refrigerant that flows through the first utilization-side heat exchanger increases when receiving a request for high-temperature air that temporarily increases a temperature of hot air blown out through the first utilization-side heat exchanger.

According to the air conditioner according to the first aspect, the control unit changes the control of the first expansion valve so that the temperature of the refrigerant that flows through the first utilization-side heat exchanger increases when receiving the request for high-temperature air that temporarily increases the temperature of the hot air blown out through the first utilization-side heat exchanger. As a result, with respect to the hot air blown out after a heat exchange in the first utilization-side heat exchanger, a larger amount of heat is given from the refrigerant whose temperature has increased through the change of the control of the first expansion valve.

An air conditioner according to a second aspect is the air conditioner according to the first aspect, in which, when receiving the request for high-temperature air, the control unit performs control for lowering a target degree of subcooling so as to increase a superheated area occupied by a gas refrigerant in the first utilization-side heat exchanger.

According to the air conditioner according to the second aspect, when the control unit lowers the target degree of subcooling when receiving the request for high-temperature air, an opening degree of the first expansion valve increases, and the superheated area occupied by the gas refrigerant increases in the first utilization-side heat exchanger. As a result, a proportion of the high-temperature gas refrigerant in the first utilization-side heat exchanger increases.

An air conditioner according to a third aspect is the air conditioner according to the first or second aspect, in which the refrigerant circuit further includes at least one second refrigerant path to which the compressor, a second utilization-side heat exchanger, a second expansion valve controlled by the control unit, and the heat source-side heat exchanger are connected in order, and when receiving the request for high-temperature air, the control unit changes a turn-off condition of a heating operation of the second refrigerant path such that the heating operation using the second refrigerant path for which the request for high-temperature air has not been made easily enters an off-state of operation.

According to the air conditioner according to the third aspect, when the turn-off condition is changed by the control unit so that the heating operation using the second refrigerant path for which the request for high-temperature air has not been made can easily enter the off-state of operation, a period during which the heating operation using the second refrigerant path stays in the off-state of operation increases, and thus a liquid refrigerant is likely to accumulate in the second refrigerant path.

An air conditioner according to a fourth aspect is the air conditioner according to the third aspect, in which, when receiving the request for high-temperature air, the control unit changes the turn-off condition such that a difference between a set temperature and an indoor temperature, which is a condition for turning off the heating operation of the second refrigerant path, is reduced or set to 0.

An air conditioner according to a fifth aspect is the air conditioner according to any one of the first to fourth aspects, in which, when receiving the request for high-temperature air, the control unit performs control for increasing a flow rate of the refrigerant that flows through the first utilization-side heat exchanger by increasing the number of rotations of the compressor.

According to the air conditioner according to the fifth aspect, when the control unit receives the request for high-temperature air, the flow rate of the refrigerant that flows through the first utilization-side heat exchanger increases as the number of rotations of the compressor increases. As a result, along with an increase in the temperature of the refrigerant that flows through the first utilization-side heat exchanger through the change of the control of the first expansion valve, a larger amount of heat can be given from the refrigerant to the air that passes through the first utilization-side heat exchanger.

An air conditioner according to a sixth aspect is the air conditioner according to any one of the first to fifth aspects, further including a heat source-side fan that is controlled by the control unit and generates an air flow that passes through the heat source-side heat exchanger, in which, when receiving the request for high-temperature air, the control unit increases the number of rotations of the heat source-side fan.

According to the air conditioner according to the sixth aspect, increasing the number of rotations of the heat source-side fan promotes a heat exchange in the heat source-side heat exchanger and increases an evaporating capacity. As a result, a condensing capacity in the first utilization-side heat exchanger increases, and thus the temperature of the hot air blown out through the first utilization-side heat exchanger can be increased.

An air conditioner according to a seventh aspect is the air conditioner according to any one of the first to sixth aspects, further including a first utilization-side fan that is controlled by the control unit and generates an air flow that passes through the first utilization-side heat exchanger and is blown out as hot air, in which, when receiving the request for high-temperature air, the control unit performs control for bringing an airflow volume of the first utilization-side fan to a predetermined value or less.

According to the air conditioner according to the seventh aspect, when receiving the request for high-temperature air, the control unit brings the airflow volume of the first utilization-side fan to the predetermined value or less. As a result, as compared to a case where the airflow volume exceeds the predetermined value, the amount of air that passes through the first utilization-side heat exchanger per unit time decreases, and the amount of heat received by the air per unit volume increases.

An air conditioner according to an eighth aspect is the air conditioner according to any one of the first to seventh aspects, further including a remote controller that has a high-temperature air request operation button that is used when sending the request for high-temperature air to the control unit, in which the control unit is configured to receive the request for high-temperature air from the remote controller.

According to the air conditioner according to the eighth aspect, when the high-temperature air request operation button of the remote controller is operated, the remote controller sends the request for high-temperature air and the control unit can receive the request for high-temperature air.

An air conditioner according to a ninth aspect is the air conditioner according to any one of the first to eighth aspects, in which, when receiving the request for high-temperature air, the control unit performs control for changing, to a maximum value, a set temperature of a room to be air-conditioned to which hot air is blown out from the first utilization-side heat exchanger.

According to the air conditioner according to the ninth aspect, the control unit changes, to the maximum value, the set temperature of the room to be air-conditioned to which the hot air is blown out from the first utilization-side heat exchanger. As a result, although an indoor temperature of a space to be air-conditioned easily increases through the increase of the temperature of the hot air in response to the request for high-temperature air, as compared to a case where the set temperature is not changed, a heating operation using the first refrigerant path cannot easily enter the off-state of operation.

An air conditioner according to a tenth aspect is the air conditioner according to any one of the first to ninth aspects, in which, when receiving the request for high-temperature air, the control unit performs control for correcting an opening degree of the first expansion valve such that the temperature of the refrigerant that flows through the first utilization-side heat exchanger increases.

According to the air conditioner according to the tenth aspect, when the control unit receives the request for high-temperature air, the control unit corrects the opening degree of the first expansion valve so that the temperature of the refrigerant that flows through the first utilization-side heat exchanger increases. As a result, a large amount of heat is given to the hot air from the refrigerant in the first utilization-side heat exchanger whose temperature has increased through the correction of the valve opening degree.

An air conditioner according to an eleventh aspect is the air conditioner according to one of the first and second aspects, in which the refrigerant circuit further includes at least one second refrigerant path to which the compressor, a second utilization-side heat exchanger, a second expansion valve controlled by the control unit, and the heat source-side heat exchanger are connected in order, and when receiving the request for high-temperature air, the control unit controls the second expansion valve so as to accumulate the refrigerant in the second utilization-side heat exchanger in a case where a heating operation using the second refrigerant path for which the request for high-temperature air has not been made is in an off-state of operation.

According to the air conditioner according to the eleventh aspect, the control unit controls the second expansion valve so as to accumulate the refrigerant in the second utilization-side heat exchanger in a case where the heating operation using the second refrigerant path for which the request for high-temperature air has not been made is in the off-state of operation. As a result, an excess refrigerant generated for increasing the temperature of the refrigerant that flows through the first utilization-side heat exchanger can be appropriately distributed.

An air conditioner according to a twelfth aspect is the air conditioner according to the eleventh aspect, in which the control unit controls an opening degree of the second expansion valve so as to bring the temperature of the refrigerant sucked into the compressor close to a target temperature or bring the temperature of the refrigerant discharged from the compressor close to a target temperature when the heating operation using the second refrigerant path is in the off-state of operation.

According to the air conditioner according to the twelfth aspect, when the heating operation using the second refrigerant path is in the off-state of operation, the control unit controls the opening degree of the second expansion valve so as to bring the temperature of the refrigerant sucked into the compressor or the temperature of the refrigerant discharged from the compressor close to the target temperature. As a result, the second expansion valve can be easily controlled for accumulating the refrigerant in the second utilization-side heat exchanger.

An air conditioner according to a thirteenth aspect is the air conditioner according to the twelfth aspect, further including an intermediate temperature sensor disposed between a refrigerant outlet and a refrigerant inlet of the second utilization-side heat exchanger, in which, although the control unit shifts to protection control after the intermediate temperature sensor detects that the refrigerant is subcooled when the heating operation using the second refrigerant path is in an on-state of operation, the control unit is configured not to shift to the protection control when the heating operation is in the off-state of operation.

According to the air conditioner according to the thirteenth aspect, the control unit does not shift to the protection control even when the intermediate temperature sensor detects that the refrigerant is subcooled when the heating operation using the second refrigerant path is in the off-state of operation. As a result, even after the intermediate temperature sensor detects a subcooled state, the control unit can continue the heating operation while continuing to accumulate the liquid refrigerant.

Advantageous Effects of Invention

In the air conditioner according to the first aspect, the temperature of the hot air blown out from the first utilization-side heat exchanger that has received the request for high-temperature air can be sufficiently increased.

In the air conditioner according to the second, fifth, sixth, seventh, or tenth aspect, the amount of heat received by the air that passes through the first utilization-side heat exchanger is increased so as to sufficiently increase the temperature of the hot air.

In the air conditioner according to the third or fourth aspect, the refrigerant of the air conditioner can be appropriately distributed even if a subcooled area decreases and the superheated area increases in the first utilization-side heat exchanger of the first refrigerant path. As a result, an efficient operating state can be maintained.

In the air conditioner according to the eighth aspect, the user can make the request for high-temperature air using the remote controller as needed.

In the air conditioner according to the ninth aspect, comfort can be ensured through suppression of an increase in the number of times the hot air from the first utilization-side heat exchanger stops due to the request for high-temperature air.

In the air conditioner according to the eleventh or twelfth aspect, the temperature of the refrigerant sucked into the compressor can be easily controlled so as to be an efficient temperature.

In the air conditioner according to the thirteenth aspect, a large amount of liquid refrigerant can be stored in the second utilization-side heat exchanger in which the heating operation is in the off-state of operation. Therefore, the superheated area occupied by the gas refrigerant in the first utilization-side heat exchanger can be easily expanded.

DESCRIPTION OF EMBODIMENTS (1) Configuration

Figure 1:
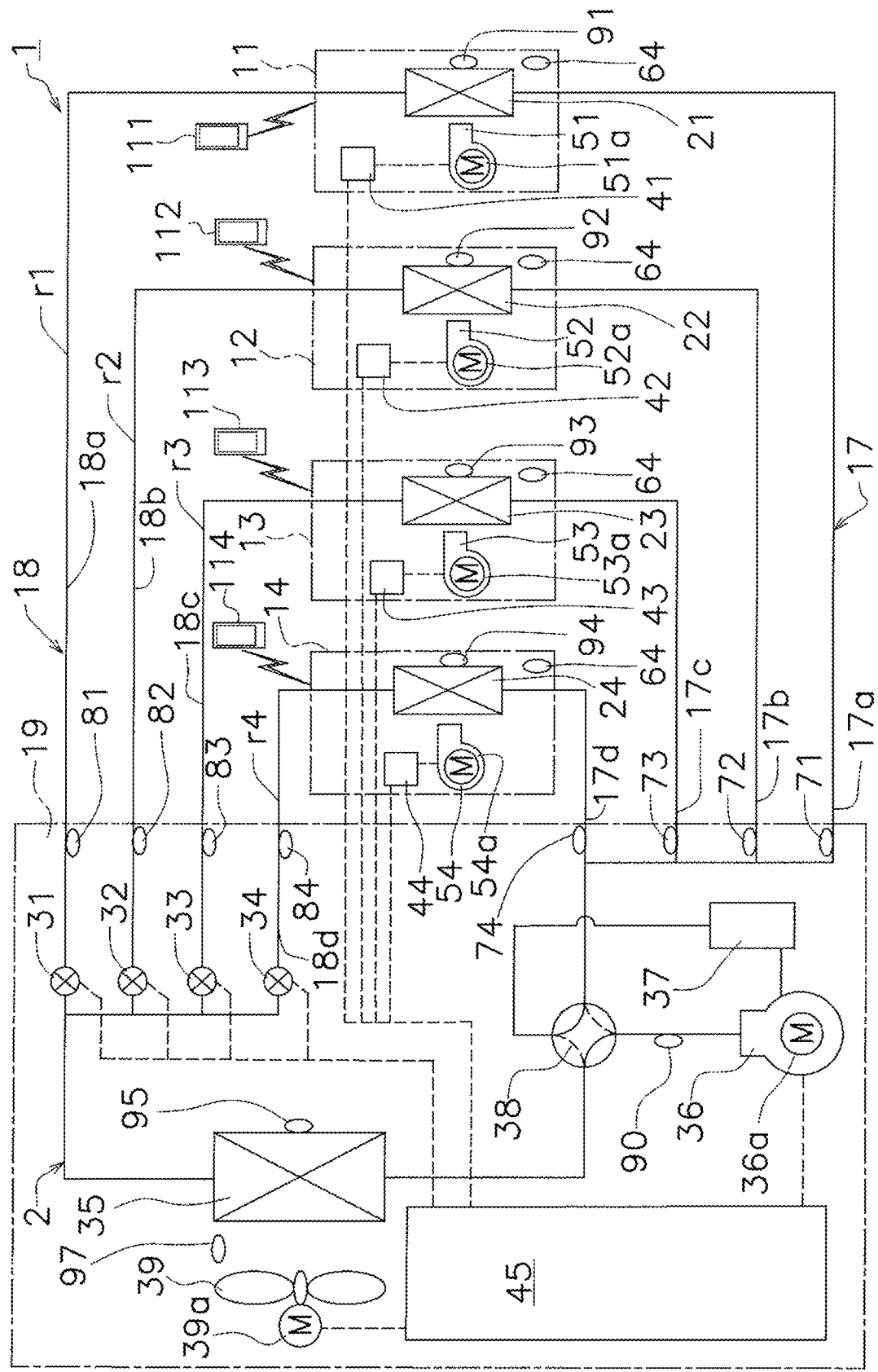
FIG. 1 is a refrigerant circuit diagram showing an air conditioner according to an embodiment of the present disclosure.

FIG. 1 shows a refrigerant circuit of an air conditioner according to an embodiment of the present disclosure. An air conditioner 1 is a multiple room type air conditioner, and has a configuration in which a plurality of indoor units 11, 12, 13, and 14 that are utilization-side units is connected in parallel to one outdoor unit 19 that is a heat source-side unit. The outdoor unit 19 accommodates a compressor 36, an accumulator 37, a four-way switching valve 38, an outdoor heat exchanger 35 that is a heat source-side heat exchanger, expansion valves 31, 32, 33, and 34, and an outdoor fan 39 that is a heat source-side fan. The indoor units 11, 12, 13, and 14 accommodate indoor heat exchangers 21, 22, 23, and 24 that are utilization-side heat exchangers and indoor fans 51, 52, 53, and 54 that are utilization-side fans.

The compressor 36 is configured such that the number of rotations thereof can be controlled by a control unit 40 described later. Here, the compressor 36 is a device that compresses a low-pressure refrigerant in a refrigeration cycle until the refrigerant has a high pressure. The compressor 36 is a capacity type compressor that is rotationally driven by a compressor motor 36a whose frequency can be controlled by an inverter. The outdoor fan 39 is driven by an outdoor fan motor 39a the number of rotations of which can be controlled by the control unit 40. The outdoor fan 39 is a propeller fan, for example, and is configured such that an airflow volume can be changed through a change of the number of rotations thereof. The expansion valves 31 to 34 are controlled by the control unit 40 so that the respective valve opening degrees are individually changed. The indoor fans 51, 52, 53, and 54 are driven by indoor fan motors 51a, 52a, 53a, and 54a the number of rotations of which can be controlled by the control unit 40, respectively. The indoor fans 51 to 54 are, for example, centrifugal fans or multiblade fans, and are configured such that the airflow volume can be changed through the change of the number of rotations thereof.

A refrigerant circuit 2 of the air conditioner 1 has a configuration in which the compressor 36, the accumulator 37, the four-way switching valve 38, the outdoor heat exchanger 35, the expansion valves 31 to 34, and the indoor heat exchangers 21 to 24 are connected.

The refrigerant that flows through a refrigerant path r1 flows through the compressor 36, the indoor heat exchanger 21, the expansion valve 31, the outdoor heat exchanger 35, the four-way switching valve 38, and the accumulator 37. The refrigerant that flows through a refrigerant path r2 flows through the compressor 36, the indoor heat exchanger 22, the expansion valve 32, the outdoor heat exchanger 35, the four-way switching valve 38, and the accumulator 37. The refrigerant that flows through a refrigerant path r3 flows through the compressor 36, the indoor heat exchanger 23, the expansion valve 33, the outdoor heat exchanger 35, the four-way switching valve 38, and the accumulator 37. The refrigerant that flows through a refrigerant path r4 flows through the compressor 36, the indoor heat exchanger 24, the expansion valve 34, the outdoor heat exchanger 35, the four-way switching valve 38, and the accumulator 37.

A vapor compression refrigeration cycle is implemented in each of the refrigerant paths r1 to r4. As a refrigerant that circulates in the refrigerant circuit 2, for example, a single refrigerant R32 (composition: 100% HFC-32) having a low global warming potential is used.

The four-way switching valve 38 and the indoor heat exchangers 21 to 24 are connected through a gas refrigerant pipe 17, and the expansion valves 31 to 34 and the indoor heat exchangers 21 to 24 are connected through a liquid refrigerant pipe 18.

In addition, the air conditioner 1 includes a number of temperature sensors including a thermistor. An outdoor temperature sensor 97 detects an outdoor temperature of an outdoor space where the outdoor unit 19 is installed. A discharge pipe temperature sensor 90 is attached to a discharge pipe of the compressor 36, and detects a discharge temperature To of the refrigerant discharged from the compressor 36. An outdoor heat-exchange temperature sensor 95 that detects an evaporation temperature during a heating operation is attached to the outdoor heat exchanger 35 that is a heat source-side heat exchanger, and detects an evaporation temperature Te during the heating operation. Indoor heat-exchange temperature sensors 91, 92, 93, and 94 are attached to the indoor heat exchangers 21, 22, 23, and 24, and detect condensation temperatures Tc1 to Tc4 during the heating operation. Liquid pipe temperature sensors 81, 82, 83, and 84 are attached to respective parts 18a, 18b, 18c, and 18d of the liquid refrigerant pipe 18 branched from the outdoor heat exchanger 35 and extending to the indoor heat exchangers 21 to 24, and detect liquid pipe temperatures Tl1 to Tl4. Indoor temperature sensors 61 to 64 are disposed in the corresponding indoor units 11 to 14 so as to detect indoor temperatures Tr1 to Tr4 that are temperatures of indoor air taken into the indoor units 11 to 14, respectively. Gas pipe temperature sensors 71 to 74 are attached to respective parts 17a, 17b, 17c and 17d of the gas refrigerant pipe 17 branched from the four-way switching valve 38 and extending to the indoor heat exchangers 21 to 24. Based on detection values of the temperature sensors described above, the control unit 40 controls an operation of the air conditioner 1. The control unit 40 can be configured by a controller (automatic control device).

(2) Operation (2-1) Flow of Refrigerant During Cooling Operation

Next, an outline of the operation of the air conditioner 1 will be described. During a cooling operation, the four-way switching valve 38 is maintained in a state indicated by solid lines in FIG. 1. A high-temperature and high-pressure gas refrigerant discharged from the compressor 36 flows into the outdoor heat exchanger 35 through the four-way switching valve 38, and exchanges heat with outdoor air supplied by the outdoor fan 39 in the outdoor heat exchanger 35 to be condensed and liquefied. The liquefied refrigerant is decompressed by the expansion valves 31 to 34, and the heat of the liquefied refrigerant is further exchanged with indoor air supplied by the indoor fans 51 to 54 in the indoor heat exchangers 21 to 24 to be evaporated. The indoor air cooled through the evaporation of the refrigerant is blown out into an indoor space by the indoor fans 51 to 54 to cool the indoor space. Further, the refrigerant evaporated and vaporized in the indoor heat exchangers 21 to 24 returns to the outdoor unit 19 through the gas refrigerant pipe 17, and is sucked into the compressor 36 through the four-way switching valve 38 and the accumulator 37.

(2-2) Flow of Refrigerant During Heating Operation

During a heating operation, the four-way switching valve 38 is maintained in a state indicated by broken lines in FIG. 1. The high-temperature and high-pressure gas refrigerant discharged from the compressor 36 flows into the indoor heat exchangers 21 to 24 of the indoor units 11 to 14 through the four-way switching valve 38, and exchanges heat with the indoor air supplied by the indoor fans 51 to 54 in the indoor heat exchangers 21 to 24 to be condensed and liquefied. The indoor air heated through the condensation of the refrigerant is blown out into the indoor space by the indoor fans 51 to 54 to heat the indoor space. The refrigerant liquefied in the indoor heat exchangers 21 to 24 returns to the outdoor unit 19 through the liquid refrigerant pipe 18. The refrigerant returned to the outdoor unit 19 is decompressed by the expansion valves 31 to 34, and the heat of the refrigerant is further exchanged with the outdoor air supplied by the outdoor fan 39 in the outdoor heat exchanger 35 to be evaporated. The refrigerant evaporated and vaporized in the outdoor heat exchanger 35 is sucked into the compressor 36 through the four-way switching valve 38 and the accumulator 37.

As described above, during the heating operation, the indoor heat exchangers 21 to 24 (utilization-side heat exchangers) function as refrigerant radiators to heat the room, and the outdoor heat exchanger 35 (heat source-side heat exchanger) functions as a refrigerant evaporator.

(3) Control (3-1) Outline

Figure 2:
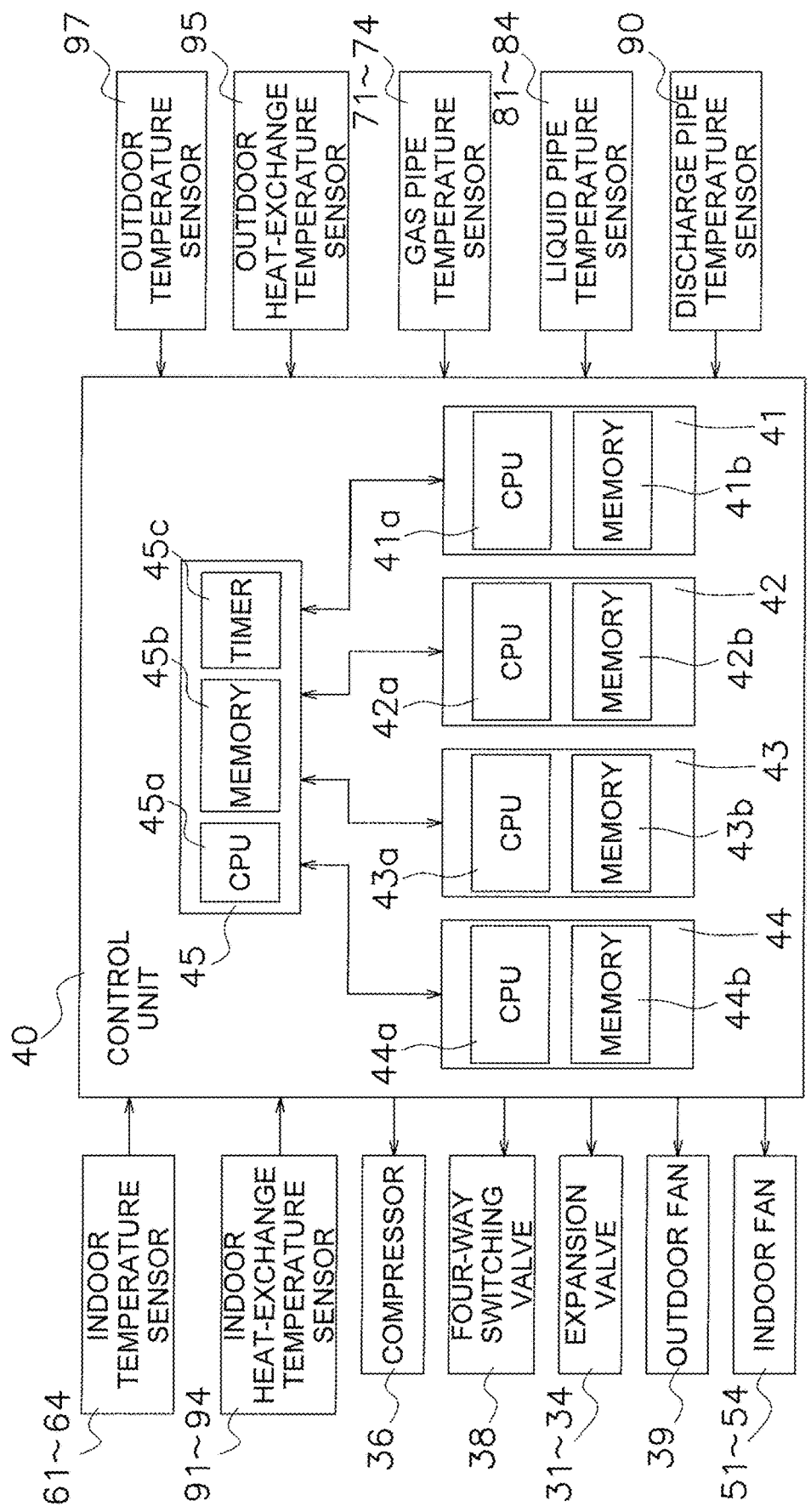
FIG. 2 is a block diagram showing a control system of the air conditioner.

FIG. 2 shows an outline of the control system of the air conditioner 1. The control unit 40 includes indoor control devices 41 to 44 and an outdoor control device 45. Specifically, a control board (corresponding to the outdoor control device 45) in an electric component box (not shown) of the outdoor unit 19 and control boards in electric component boxes (not shown) of the indoor units 11 to 14 (corresponding to the indoor control devices 41 to 44) are connected to form the control unit 40. The indoor control devices 41 to 44 include CPUs 41a to 44a and memories 41b to 44b. The outdoor control device 45 includes a CPU 45a, a memory 45b, and a timer 45c. In the memories 41b to 45b, programs and data for controlling the indoor units 11 to 14 and the outdoor unit 19 are described. The CPUs 41a to 45a generate signals for controlling each device by executing the programs described in the memories 41b to 45b. Furthermore, the indoor units 11 to 14 are provided with a receiving unit that receives commands from remote controllers 111 to 114 that are operated and input by the user, a motor driver that changes a blowing direction of conditioned air, a display unit that displays an operating mode, and the like.

As shown in FIG. 2, the control unit 40 receives detection values of the above-described temperature sensors, and controls a cooling operation and a heating operation based on those values.

(3-2) Cooling Operation Control

The control unit 40 controls a frequency of the compressor 36 and opening degrees of the expansion valves 31 to 34 during the cooling operation. Since the control during the cooling operation is the same as the conventional one, the description is omitted here.

(3-3) Heating Operation Control

The control unit 40 performs following control: activation control for starting the heating operation by activating the compressor 36 that has stopped; target discharge pipe temperature control and subcooling control for adjustment of the opening degrees of the expansion valves 31 to 34 during a normal heating operation in which the refrigerant state is stable after the activation; capacity control of the compressor 36 during the normal heating operation; control when a request for high-temperature air is made; defrost control for melting frost attached to the outdoor heat exchanger 35; and the like. Here, the target discharge pipe temperature control, the subcooling control, and the capacity control during the normal heating operation that are related to the technique of the present disclosure, and the high-temperature air control when the request for high-temperature air is made will be described.

(3-3-1) Target Discharge Pipe Temperature Control During Normal Heating Operation In the target discharge pipe temperature control, a configuration is provided in which a degree of superheating on an inlet side of the compressor 36 is indirectly controlled through control of the opening degrees of the expansion valves 31 to 34 using a discharge pipe temperature, and a discharge temperature of the compressor 36 and an operation of the compressor 36 can be managed even when the refrigerant sucked by the compressor 36 is wet. Even when the refrigerant sucked into the compressor 36 is wet, a discharge pipe temperature is controlled within a range in which the compressor 36 is not damaged.

In the target discharge pipe temperature control during the normal heating operation, the control unit 40 adjusts the opening degrees of the expansion valves 31 to 34 so that the discharge temperature To detected by the discharge pipe temperature sensor 90 comes close to a target discharge pipe temperature Tm. Precisely, the temperature detected by the discharge pipe temperature sensor 90 is the temperature of the discharge pipe of the compressor 36, not the temperature of the discharged refrigerant. Therefore, the temperature detected by the discharge pipe temperature sensor 90 is preferably corrected in some cases. However, here, the description will be made assuming that the temperature detected by the discharge pipe temperature sensor 90 is equal to the temperature of the discharged refrigerant.

The control unit 40 determines the target discharge pipe temperature Tm based on the evaporation temperature Te detected by the outdoor heat-exchange temperature sensor 95 and a condensation temperature Tc detected by the indoor heat-exchange temperature sensors 91 to 94. In a case of a normal operation, the target discharge pipe temperature Tm is a value that ensures 10° C. or more of a degree of discharge superheating described later.

Through this target discharge pipe temperature control, the refrigerant is sucked into the compressor 36 and discharged from the compressor 36 at a point (pressure and temperature) where an efficiency of the refrigeration cycle is high. In addition, while the opening degrees of the expansion valves 31 to 34 as a whole are adjusted through the target discharge pipe temperature control, the opening degree of each of the expansion valves 31 to 34 is adjusted depending on a heating capacity required in each of the indoor units 11 to 14.

(3-3-2) Capacity Control of Compressor During Normal Heating Operation

Capacity control of the compressor 36 during the normal heating operation is control for increasing or decreasing the number of rotations of the compressor 36 based on requests from the indoor units 11 to 14. Specifically, based on differences between the indoor temperatures Tr1 to Tr4 detected by the indoor temperature sensors 61 to 64 of the indoor units 11 to 14 and set temperatures Ts1 to Ts4 set by the remote controllers 111 to 114, the control unit 40 determines a necessary output of the compressor 36, and changes the number of rotations of the compressor 36.

(3-3-3) Subcooling Control During Normal Heating Operation

Subcooling control during the normal heating operation is control for correcting the opening degrees of each of the expansion valves 31 to 34 determined through the target discharge pipe temperature control so that the refrigerant is appropriately distributed during the heating operation. The control unit 40 uses the liquid pipe temperatures Tl1 to Tl4 detected by the liquid pipe temperature sensors 81 to 84 in the operation-ongoing-rooms and the condensation temperatures Tc1 to Tc4 detected by the indoor heat-exchange temperature sensors 91 to 94 to calculate degrees of subcooling SC1 to SC4 of the operation-ongoing-rooms. For example, through subtraction of the liquid pipe temperatures Tl1 to Tl4 from the condensation temperatures Tc1 to Tc4 as in (SC1=Tc1−Tl1), the degrees of subcooling SC1 to SC4 of the operation-ongoing-rooms can be obtained. In this embodiment, a description is given assuming that the indoor units 11 to 14 are disposed in different first to fourth rooms.

Here, any one of the first to fourth rooms where the corresponding one of the indoor units 11 to 14 is in the on-state of operation is referred to as an operation-ongoing-room. On the other hand, any one of the first to fourth rooms where the corresponding one of the indoor units 11 to 14 is in the off-state of operation is referred to as an operation-stopping-room.

In parallel with the above-described calculation for the degrees of subcooling SC1 to SC4, the control unit 40 uses, for example, the number of rotations fc of the compressor 36, the temperature difference between the discharge temperature To and the target discharge pipe temperature Tm, and the like to calculate a target degree of subcooling SCm. For example, when the indoor unit 11 in the first room performs the on-state of operation, the target degree of subcooling SCm is compared with the degree of subcooling SC1 of the indoor unit 11 in the first room that is an operation-ongoing-room, and the opening degree of the expansion valve 31 is corrected.

If the degree of subcooling SC1 in the first room is smaller than the target degree of subcooling SCm (SC1<SCm), the opening degree of the expansion valve 31 in the first room is increased.

If the degree of subcooling SC1 in the first room is larger than the target degree of subcooling SCm (SC1>SCm), the opening degree of the expansion valve 31 in the first room is reduced.

If the degree of subcooling SC1 in the first room is equal to the target degree of subcooling SCm (SC1=SCm), the opening degree of the expansion valve 31 in the first room is maintained as it is.

In order to widen a range of maintaining the valve opening degree, the valve opening degree may be controlled so as not to change when a difference ΔSC between the degree of subcooling SC1 and the target degree of subcooling SCm is within a predetermined range.

(4) High-Temperature Air Control

The high-temperature air control is started, for example, when the user operates a high-temperature air request operation button for requesting high-temperature air provided on the remote controllers 111 to 114. Here, the high-temperature air control is control for temporarily increasing the temperature of the hot air blown out through the first utilization-side heat exchanger of a room in which the indoor unit that has received the request for high-temperature air is installed when the request for high-temperature air has been received. In the following description, a room in which an indoor unit for which the request for high-temperature air has been made is installed may be called a high-temperature air room, and a room in which an indoor unit for which the request for high-temperature air has not been made is installed may be called another room.

For example, if the user operates the high-temperature air request operation button of the remote controller 114 to send the request for high-temperature air, the fourth room is the high-temperature air room, and the indoor heat exchanger 24 in the fourth room corresponds to the first utilization-side heat exchanger. When the high-temperature air request operation button is operated on a plurality of remote controllers among the remote controllers 111 to 114, a configuration may be provided in such a manner that a plurality of rooms becomes high-temperature air rooms, and indoor heat exchangers of the plurality of high-temperature air rooms correspond to the first utilization-side heat exchanger. In addition, since there are cases where performing the high-temperature air control is not appropriate even when the request is made, a configuration may be provided in such a manner that the control unit 40 controls the high-temperature air when the high-temperature air request operation button being pressed is set as one start condition and other start conditions are also satisfied. Alternatively, a configuration may be provided in such a manner that the high-temperature air control is started by a method other than the method of operating the high-temperature air request operation buttons of the remote controllers 111 to 114. However, in order to simplify the description here, it is assumed that the high-temperature air control is started when the user operates the high-temperature air request operation buttons of the remote controllers 111 to 114. In the following description, the indoor heat exchanger in a room for which the high-temperature air request operation button is pressed is referred to as a first utilization-side heat exchanger. In addition, a path to which the first utilization-side heat exchanger is connected is referred to as a first refrigerant path, and an expansion valve in the first refrigerant path is referred to as a first expansion valve. As described above, when the high-temperature air request operation button of the remote controller 114 is operated, the refrigerant path r4 is the first refrigerant path, and the expansion valve 34 is the first expansion valve.

For example, the control unit 40 counts an elapsed time with the timer 45c after the high-temperature air control has started, and cancels the high-temperature air control on condition that a preset time (for example, 30 minutes) has been reached. Further, when the control unit 40 determines that continuing the high-temperature air control is not appropriate, the control unit 40 cancels the high-temperature air control. For example, when the indoor unit 14 in the high-temperature air room is turned off by an instruction from the remote controller 114, the indoor unit that has sent the request for high-temperature air no longer exists. In such a case, the high-temperature air control is canceled even if the count of the timer 45c has not reached the set time.

(4-1) Capacity Increase for High-Temperature Air Control

The control unit 40 performs control for increasing a flow rate of the refrigerant that flows through the first utilization-side heat exchanger when receiving the request for high-temperature air. Specifically, the control unit 40 increases the number of rotations of the compressor 36 when receiving the request for high-temperature air. For example, the control unit 40 adds a correction value to the number of rotations of the compressor 36 to increase the number of rotations of the compressor 36 as compared with that before receiving the request for high-temperature air. Further, in order to increase the number of rotations of the compressor 36 when receiving the request for high-temperature air, the control unit 40 may be configured to increase an upper limit value of the number of rotations of the compressor 36, for example.

The control unit 40 performs control for increasing the flow rate of the outside air that flows through the heat source-side heat exchanger when receiving the request for high-temperature air. Specifically, the control unit 40 increases the number of rotations of the outdoor fan 39 when receiving the request for hot air. For example, the control unit 40 sets the number of rotations of the outdoor fan 39 to a maximum value when receiving the request for high-temperature air.

(4-2) Ensuring Amount of Heat Per Unit Volume of Air Passing Through Heat Exchanger The control unit 40 performs control for limiting the amount of air blown out as hot air through the first utilization-side heat exchanger that has received the request for high-temperature air. Here, the first utilization-side fan blows air to the first utilization-side heat exchanger in the high-temperature air room. Specifically, for example, when the high-temperature air request operation button of the remote controller 112 is operated, the control unit 40 limits the fan tap of the indoor fan 52 that has become the first utilization-side fan to a tap having an airflow volume of a preset tap or less. For example, when the indoor fan 52 can be switched in six stages, the fan tap is limited to the third or less from the smallest airflow volume. When the airflow volume becomes too small, the user may not easily have a feeling of receiving the high-temperature air. Therefore, an appropriate airflow volume is set so that the temperature of the hot air does not decrease too much. Further, when reducing the airflow volume, the control unit 40 controls the airflow volume to gradually decrease.

(4-3) Changing Opening Degree of Expansion Valve

Figure 3A:
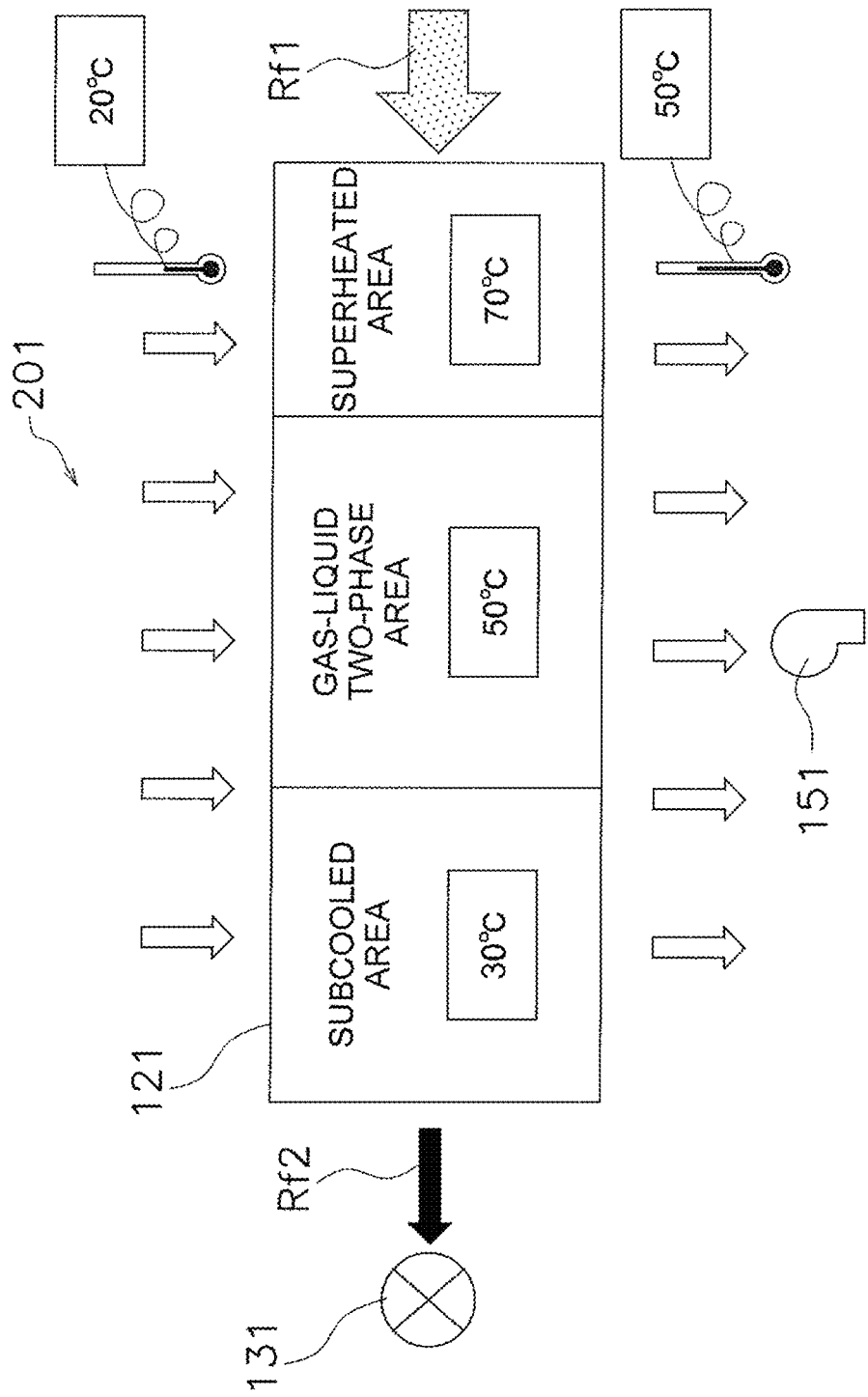
FIG. 3A is a schematic diagram for describing a state of a first utilization-side heat exchanger before high-temperature air control.
Figure 3B:
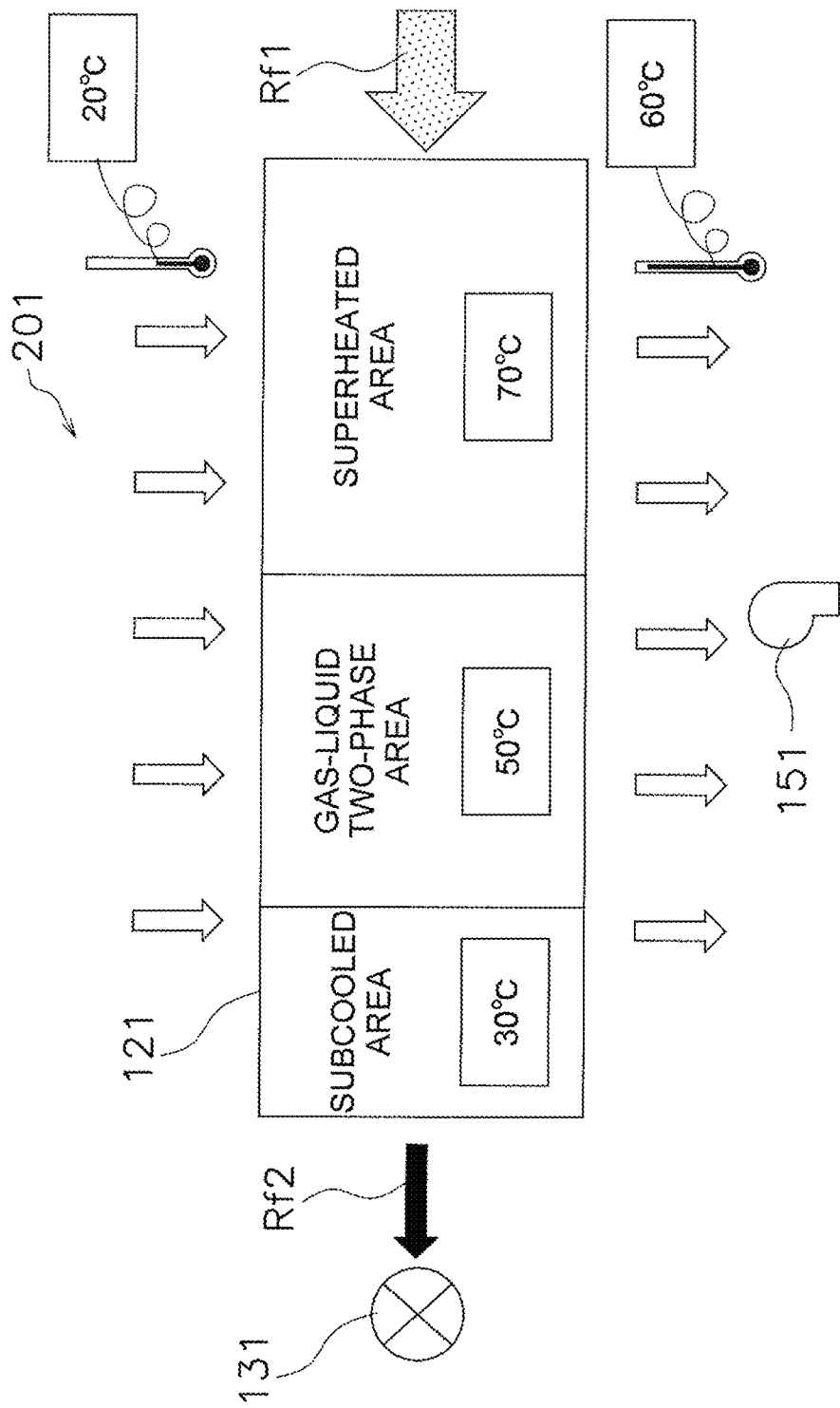
FIG. 3B is a schematic diagram for describing a state of the first utilization-side heat exchanger after the high-temperature air control.
Figure 3C:
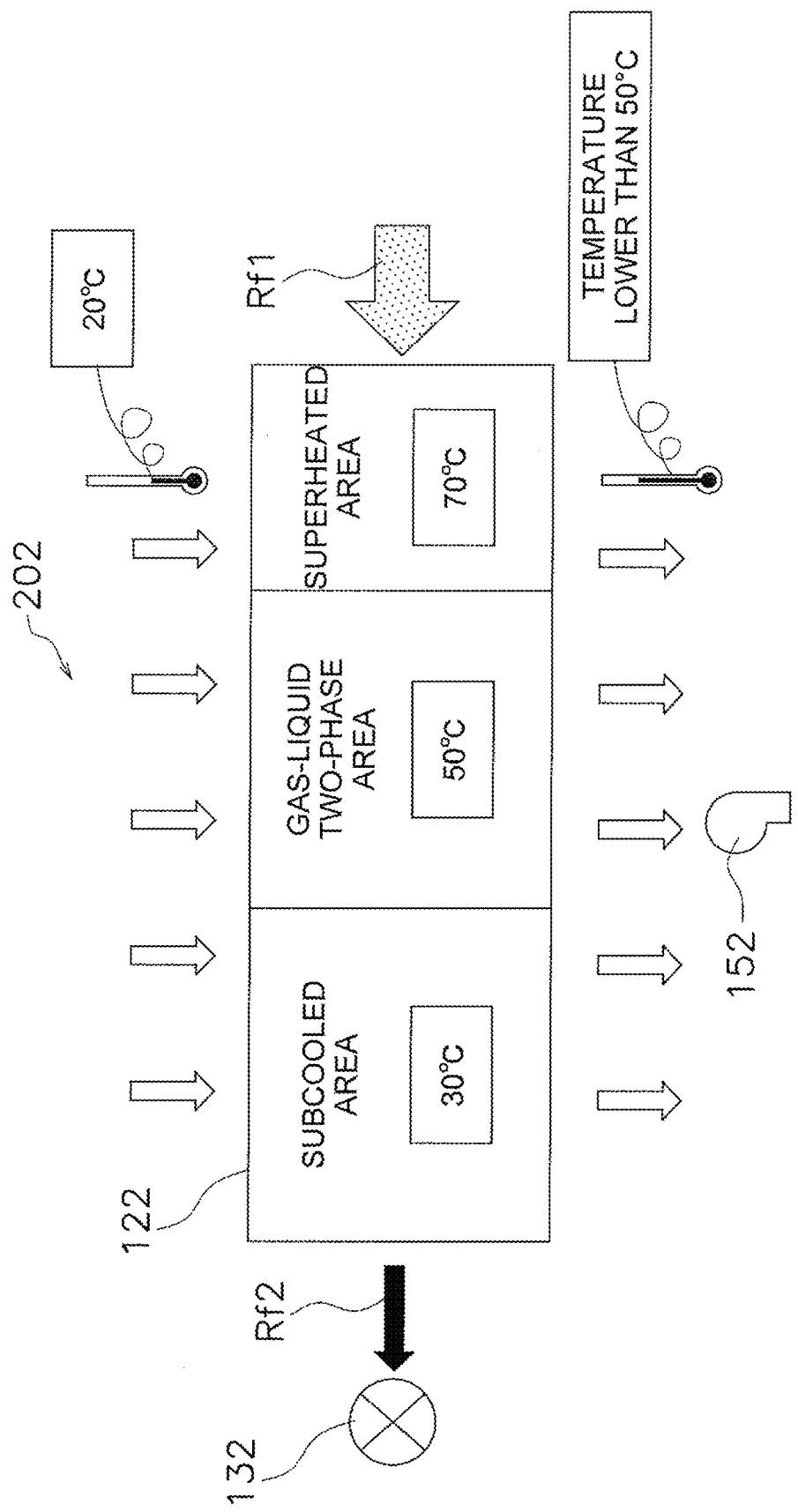
FIG. 3C is a schematic diagram for describing a state of a second utilization-side heat exchanger in an operation-ongoing-room after the high-temperature air control.
Figure 3D:
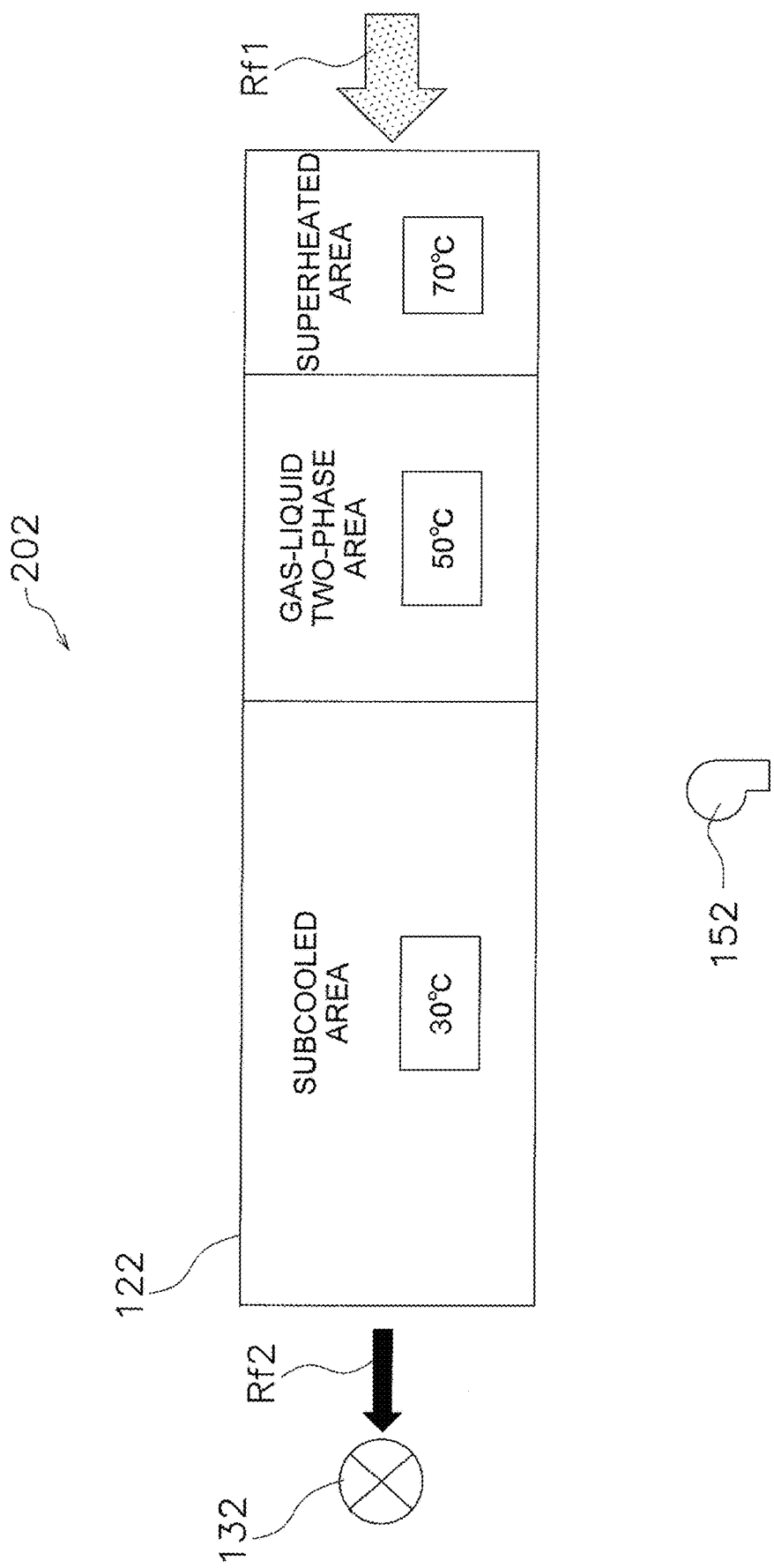
FIG. 3D is a schematic diagram for describing a state of the second utilization-side heat exchanger in an operation-stopping-room after the high-temperature air control.

When receiving the request for high-temperature air, the control unit 40 changes the control of the first expansion valve so that the temperature of the refrigerant that flows through the first utilization-side heat exchanger in a high-temperature air room increases. In other words, the control unit 40 changes the opening degree of the first expansion valve so as to increase an average temperature of the first utilization-side heat exchanger. Specifically, the superheated area formed by a gas refrigerant Rf1 flowing into a first utilization-side heat exchanger 121 as shown in FIG. 3A before the high-temperature air control is increased as shown in FIG. 3B after the high-temperature air control. Accordingly, the subcooled area that has been large as shown in FIG. 3A before the high-temperature air control becomes smaller as the subcooled area shown in FIG. 3B after the high-temperature air control. As a result, for example, while the first utilization-side heat exchanger 121 has increased the indoor temperature of 20° C. to 50° C. through a heat exchange before the high-temperature air control, the first utilization-side heat exchanger 121 can increase the indoor temperature of 20° C. to 60° C. through the heat exchange after the high-temperature air control. On the other hand, in a second utilization-side heat exchanger 122 of a second utilization-side unit 202 for which the request for high-temperature air has not been made in an operation-ongoing-room, after the high-temperature air control, as shown in FIG. 3C, the subcooled area tends to increase and the superheated area tends to decrease, and the temperature of the hot air blown out from the second utilization-side heat exchanger 122 becomes lower. Further, in the second utilization-side heat exchanger 122 of the second utilization-side unit 202 for which the request for high-temperature air has not been made in an operation-stopping-room, a second utilization-side fan is stopped, and after the high-temperature air control, as shown in FIG. 3D, the subcooled area further increases and the superheated area further decreases.

In FIGS. 3A to 3D, the refrigerant flowing out from the subcooled area is a liquid refrigerant Rf2. In addition, shown is a case where the average temperature of the refrigerant in the superheated area is 70° C., the temperature of the refrigerant in the gas-liquid two-phase area is 50° C., and the temperature of the refrigerant in the subcooled area is 30° C. However, this is a model for an explanation, and the actual case does not necessarily match this model. Further, in FIGS. 3A, 3B, and 3C, a first expansion valve 131 expands the liquid refrigerant Rf2 output from the first utilization-side heat exchanger 121, a first utilization-side fan 151 sends air to the first utilization-side heat exchanger 121, a second expansion valve 132 expands the liquid refrigerant Rf2 output from the second utilization-side heat exchanger 122, and a second utilization-side fan 152 sends air to the second utilization-side heat exchanger 122.

(4-3-1) Changing Subcooling Control (4-3-1-1) Changing Target Degree of Subcooling of Operation-Ongoing-Room When a first utilization-side unit 201 having the first utilization-side heat exchanger 121 shown in FIGS. 3A and 3B receives the request for high-temperature air, the control unit 40 performs control for lowering the target degree of subcooling SCm with respect to the first utilization-side unit 201 having the first utilization-side heat exchanger 121 so as to increase the superheated area occupied by the gas refrigerant in the first utilization-side heat exchanger 121. For example, after calculating the target degree of subcooling SCm in the same manner as the normal heating operation, the control unit 40 calculates a target degree of subcooling SCmH for the high-temperature air control by subtracting a predetermined value set in advance from the target degree of subcooling SCm. The predetermined value may be a constant, a value calculated according to a predetermined calculation formula, or a value described in a table in the memories 41b to 45b, for example. For example, if the target degree of subcooling SCm during the normal heating operation is 12 degrees, when one of the four indoor units 11 to 14 connected as shown in FIG. 1 has made the request for high-temperature air, the target degree of subcooling SCmH of the indoor unit in the high-temperature air room for which the request for high-temperature air has been made is changed to 5 degrees after the change. When there are two or more high-temperature air rooms for which the request for high-temperature air has been made, the target degree of subcooling SCmH is preferably increased in consideration of effects on other rooms and for efficient overall operation. For example, in a case where there are two high-temperature air rooms (when two indoor units have made the request for high-temperature air), while the target degree of subcooling SCmH is 5 degrees when there is one high-temperature air room (only one indoor unit has made the request for high-temperature air), in a case where there are two high-temperature air rooms, for example, the target degree of subcooling SCmH is set to 7 to 8 degrees for both rooms, and in a case where there are three high-temperature air rooms, the target degree of subcooling SCmH is set to 9 to 11 degrees. In other words, when a plurality of indoor units has made the request for high-temperature air, the amount of decrease in the target degree of subcooling SCmH is preferably reduced as the number of indoor units that make the request increases.

(4-3-1-2) Target Degree of Subcooling in Operation-Ongoing-Rooms of Other Rooms

Here, the control unit 40 is configured to perform control for maintaining the target degree of subcooling SCm of an indoor unit for which the request for high-temperature air has not been made as it is during the normal heating operation. Alternatively, the control unit 40 may be configured to perform control for increasing the target degree of subcooling of a room for which the request for high-temperature air has not been made in order to further concentrate the capacity in the high-temperature air room. For example, in a case where the indoor unit 11 has made the request for high-temperature air and the indoor units 12 to 14 have not made the request, while the target degree of subcooling SCm has been 12 degrees immediately before the high-temperature air control has started, the target degree of subcooling SCmH of the indoor unit 11 is set to 5 degrees, and the target degree of subcooling SCmH of the indoor units 12 to 14 is set to 13 degrees after the high-temperature air control starts.

(4-3-1-3) Control of Indoor Unit in Operation-Stopping-Room

With respect to the indoor unit in an operation-stopping-room, the control unit 40 controls the target discharge pipe temperature instead of controlling the subcooling. Through this target discharge pipe temperature control, the opening degree of the expansion valve corresponding to the operation-stopping-room is changed to decrease. At this time, the indoor fan in the operation-stopping-room is stopped. However, since the opening degree of the expansion valve is decreased, the amount of liquid refrigerant reduced in the first utilization-side heat exchanger 121 (see FIG. 3B) in the high-temperature air room for which the request for high-temperature air has been made accumulates in the indoor heat exchanger in the operation-stopping-room. As a result, the distribution of the refrigerant as a whole of the air conditioner 1 is optimized, and an efficient heating operation can be continued. For example, a reservoir for storing the refrigerant ejected from the first utilization-side heat exchanger 121 may be provided in the refrigerant circuit 2. However, as described above, through storing of an excess refrigerant in the indoor heat exchanger in the operation-stopping-room, an addition of equipment such as a reservoir can be omitted.

The indoor heat-exchange temperature sensors 91 to 94 attached to the indoor heat exchangers 21 to 24 function as intermediate temperature sensors disposed between the refrigerant outlets and the refrigerant inlets of the indoor heat exchangers 21 to 24. For example, when the indoor heat exchanger 21 is in the heating operation using the refrigerant path r1, which is the second refrigerant path for which the request for high-temperature air has not been made, the control unit 40 shifts to protection control after the indoor heat-exchange temperature sensor 91 detects that the refrigerant is subcooled when the indoor unit 11 is in the on-state of operation. However, the control unit 40 is configured not to shift to the protection control when the indoor unit 11 is in the off-state of operation. In this case, when the room where the indoor unit 11 is installed becomes an operation-stopping-room, as already described, the liquid refrigerant tends to accumulate in the indoor heat exchanger 21, and thus the indoor heat-exchange temperature sensor 91 is more likely to detect the temperature of the liquid refrigerant. As described above, through provision of a configuration in which the protection control is not performed even if the indoor heat-exchange temperature sensor 91 detects subcooling, a large amount of refrigerant can be stored in the indoor unit 11 for which the request for high-temperature air has not been made and which is in the off-state of operation.

(4-3-2) Suppressing Off-State of Operation of Indoor Unit for which Request for High-Temperature Air has been Made A large amount of heat is supplied to the indoor air in a high-temperature air room where the indoor unit is installed for which the request for high-temperature air has been made. Therefore, the set temperature set by the user is often exceeded. Accordingly, if the heating operation is managed with the set temperature set by the user as a target, the indoor unit frequently repeats a on-state and a off-state of operation, thereby impairing comfort of the user. The control unit 40 automatically changes the set temperature of the indoor unit from which the high-temperature air is blown out to the maximum value so that the on-state and the off-state of operation are not repeated as described above. The changed set temperature is returned to the user setting by the control unit 40 when the high-temperature air control ends.

(4-3-3) Promoting Off-State of Operation of Indoor Unit for which Request for High-Temperature Air has not been Made Here, assuming that the indoor unit 13 is a first utilization-side unit for which the request for high-temperature air has been made, and the other indoor units 11, 12, and 14 are second utilization-side units for which the request for high-temperature air has not been made, the control unit 40 changes a turn-off condition of the indoor units 11, 12, and 14 so that the heating operation using the refrigerant paths r1, r2, and r4 that are the second refrigerant paths easily enters the off-state of operation. For example, before the high-temperature air control starts, the indoor units 11, 12, and 14 in the other rooms have been in the off-state of operation when differences between the set temperatures Ts1, Ts2, and Ts4 and the indoor temperatures Tr1, Tr2, and Tr4, that is, differences $\Delta Td1$ (=Tr1−Ts1), $\Delta Td2$ (=Tr2−Ts2), and $\Delta Td4$ (=Tr4−Ts4), are 3 degrees. However, the control unit 40 changes and mitigates the turn-off condition so that the indoor units 11, 12, and 14 turn off when the difference is 0 degrees, that is, when the set temperatures Ts1, Ts2, and Ts4 and the indoor temperatures Tr1, Tr2, and Tr4 are equal. The change of the turn-off condition is not necessarily the same. For example, the change may be different such that the difference $\Delta Td1$ is 0 degrees for the indoor unit 11 and the difference $\Delta Td2$ is 1 degree for the indoor unit 12.

(4-3-4) Airflow Volume Control of Indoor Unit for which Request for High-Temperature Air has not been Made The temperature of the hot air of the indoor unit installed in a high-temperature air room for which the request for high-temperature air has been made (first utilization-side unit) is affected by the airflow volume of the indoor unit in another room for which the high-temperature air request has not been made (second utilization-side unit). Further, if the second utilization-side unit repeats the on-state and the off-state of operation during the high-temperature air control, the refrigerant pressure on a high-pressure side of the refrigeration cycle does not stabilize, thereby causing hunting of the temperature of the hot air blown out from the first utilization-side unit.

Here, assuming that the indoor unit 13 is the first utilization-side unit for which the request for high-temperature air has been made, and the other indoor units 11, 12, and 14 are the second utilization-side units in the other rooms, a high-temperature air mode is entered to perform control so that the airflow volume of the indoor fans 51, 52, and 54 that are the second utilization-side fans is reduced or eliminated.

Specifically, if a high-pressure saturation temperature (the temperature detected by the indoor heat-exchange temperature sensors 91 to 94) is not equal to or higher than a constant temperature (Tp1° C.), the control unit 40 gradually decreases the airflow volume of the indoor fans 51, 52, and 54. For example, a pressure sensor may be used as the indoor heat-exchange temperature sensors 91 to 94, and a high-pressure refrigerant pressure detected by the pressure sensor may be converted into a pressure equivalent saturation temperature. If the indoor heat-exchange temperature sensors 91 to 94 are temperature sensors such as a thermistor, the degree of subcooling may not be detected correctly. As described above, accuracy of control can be improved through replacement of a high-pressure value of a high-pressure refrigerant with a high-pressure saturation temperature.

Figure 4:
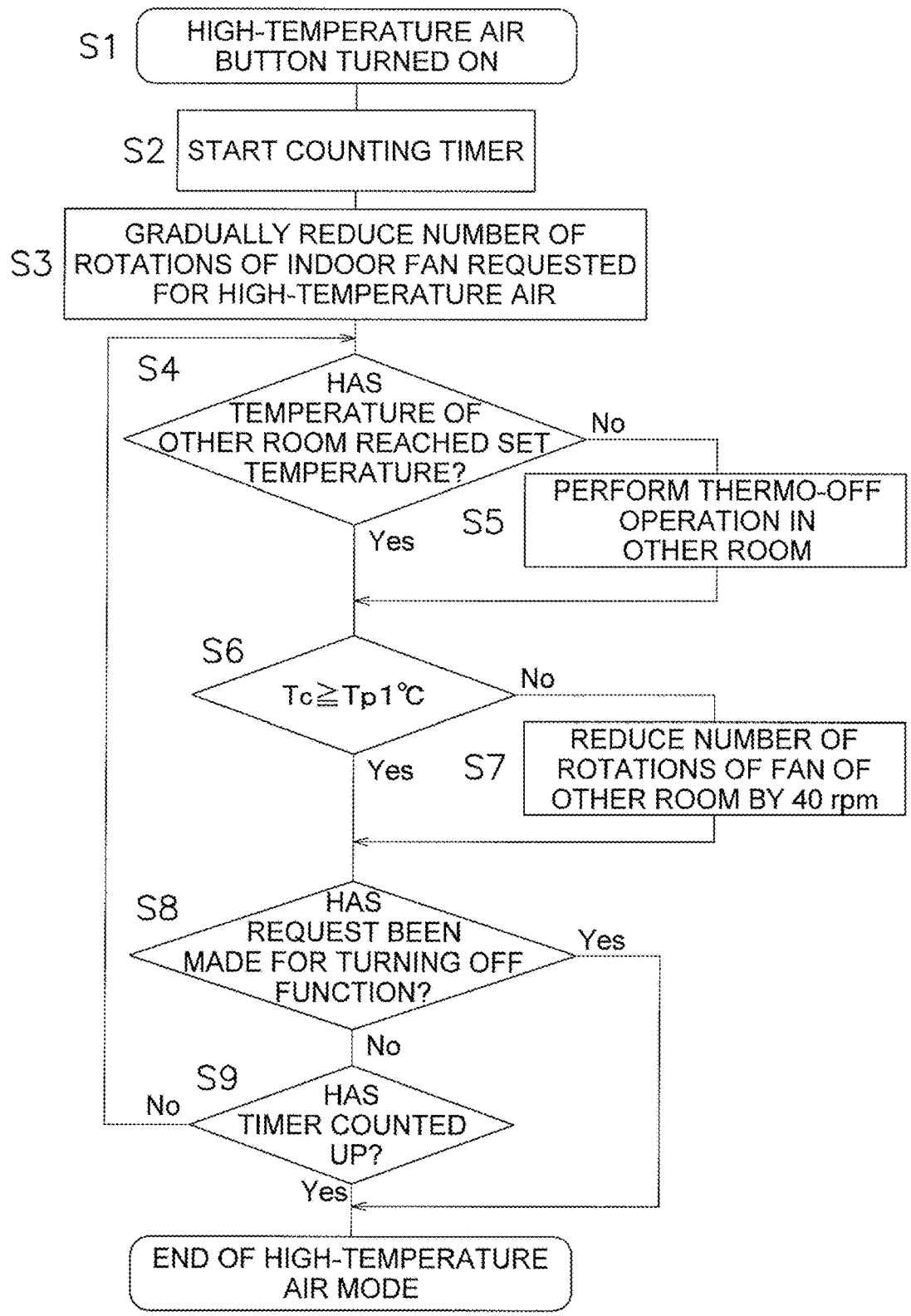
FIG. 4 is a flowchart for describing control of an indoor unit in another room.

Control of the indoor units 11, 12, and 14 in the other rooms will be described along the flowchart of FIG. 4. First, when the high-temperature air request operation button of the remote controller 113 is operated and the request for high-temperature air is transmitted from the indoor unit 13 to the control unit 40, the high-temperature air control starts (step S1). When the high-temperature air control starts, the control unit 40 starts counting with the timer 45c (step S2). Next, as described in (4-2) above, the control unit 40 gradually reduces the number of rotations of the indoor fan 53 of the indoor unit 13 in the high-temperature air room (step S3). For example, the control unit 40 decreases the number of rotations of the indoor fan 53 at a rate of 100 to 200 rpm per minute.

Next, as described in (4-3-3) above, the turn-off condition has been changed. Before the change, the indoor units 11, 12, and 14 do not turn off unless the indoor temperatures Tr1, Tr2, and Tr4 are higher than the set temperatures Ts1, Ts2, and Ts4 by 3 degrees or more. However, whether to turn off is determined based on whether the indoor temperatures Tr1, Tr2, and Tr4 are equal to the set temperatures Ts1, Ts2, and Ts4 after the change of the turn-off condition (step S4). For example, if the indoor temperature Tr4 has reached the set temperature Ts4, the indoor unit 14 is caused to turn off (step S5). Note that step S3 and steps S4 and S5 may be performed in parallel, or step S3 may be performed after steps S4 and S5 are performed.

At this point, the indoor unit 14 turns off, but the indoor units 11 and 12 is in the on-state of operation and the indoor fans 51 and 52 are driven. The control unit 40 determines whether the high-pressure equivalent saturation temperature (condensation temperature Tc (condensation temperature Tc1, for example)) is equal to or higher than the constant temperature Tp1 (step S5). If the high-pressure equivalent saturation temperature is lower than the constant temperature Tp1, the control unit 40 reduces the number of rotations of the indoor fans 51 and 54 by 40 rpm (step S7). In this case, Tp1 is, for example, a little over 40 degrees Celsius. Here, step S8 is performed after step S7. Alternatively, a configuration may be provided such that the determination of step S6 is performed again after step S7.

When the high-pressure equivalent saturation temperature is equal to or higher than Tp1, unless a request is made for turning off a high-temperature air control function (step S8) or the timer 45c counts up (step S9), the processing returns to step S4 and the above-mentioned operation is repeated so as to continue the high-temperature air mode. When the request is made for turning off the high-temperature air control function (step S8) or the timer 45c counts up (step S9), the high-temperature air mode ends.

(5) Modifications (5-1) Modification A

In the above embodiment, the technique of the present disclosure is applied to the multiple room type air conditioner 1 in which four pairs of connection ports for liquid pipes and gas pipes that can connect the four indoor units 11 to 14 are provided in the outdoor unit 19, and which is capable of connecting two to four indoor units to the outdoor unit 19. However, the number of connectable indoor units only needs to be multiple, and the technique of the present disclosure can also be applied to an air conditioner capable of connecting up to five indoor units to one outdoor unit. The technique of the present disclosure can also be applied to an air conditioner capable of connecting up to three indoor units to one outdoor unit.

Alternatively, the technique of the present disclosure may be applied to a pair type air conditioner in which one indoor unit is connected to one outdoor unit.

(5-2) Modification B

In the above embodiment, the technique of the present disclosure is applied to the air conditioner 1 capable of switching between the cooling operation and the heating operation. However, the technique of the present disclosure can also be applied to other refrigeration apparatuses, for example, an air conditioner dedicated to heating.

(5-3) Modification C

Figure 5:
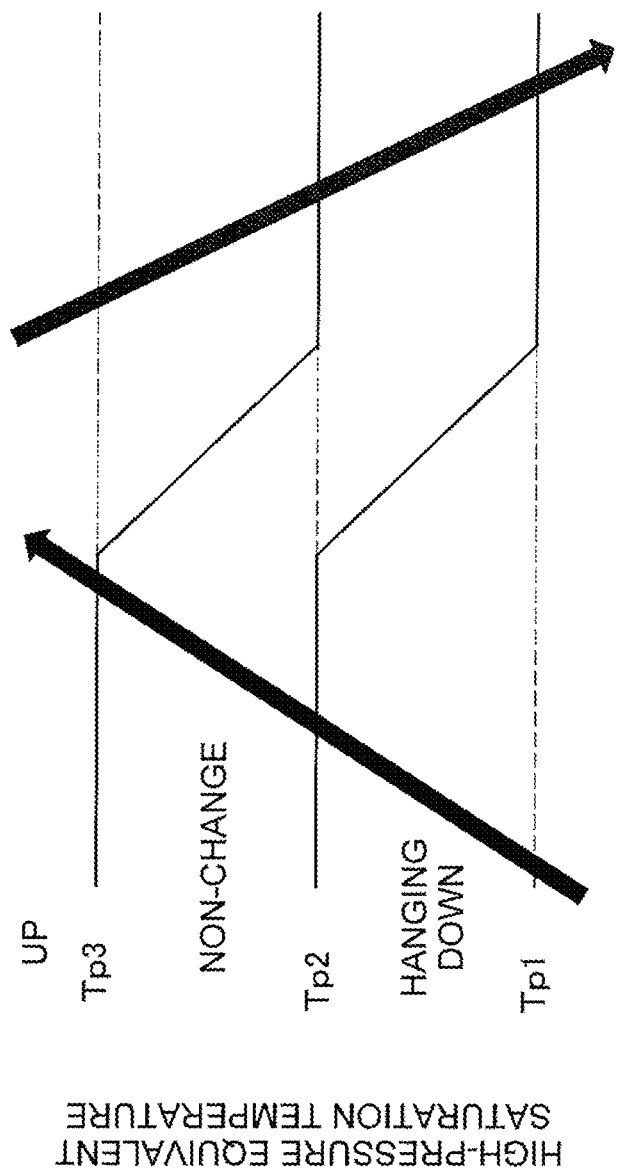
FIG. 5 is an explanatory diagram showing an example of a relationship between a high-pressure equivalent saturation temperature and a fan tap setting.

In the above embodiment, as described with reference to FIG. 4, when the high-temperature air mode is entered, control is performed so as to reduce the number of rotations of the fan in the other room. Alternatively, a configuration may be provided such that an upper limit fan tap of the operation-ongoing-room of the other room is lowered when the high-temperature air mode is entered so as to perform a control for reducing or eliminating the airflow volume of the fan of the operation-ongoing-room of the other room. As described with reference to FIG. 4 of the embodiment, if the indoor units 11 and 12 are present in the operation-ongoing-rooms of the other rooms, the control unit 40, for example, changes the upper limit fan taps of the indoor fans 51 and 52, for example, as shown in FIG. 5 based on the high-pressure equivalent saturation temperature (condensation temperature Tc (condensation temperature Tc3)) of the indoor heat exchanger 23. That is, it is determined in step S6 whether the high-pressure equivalent saturation temperature is in a hanging down zone, a non-change zone, or an up zone of FIG. 5. When the high-pressure equivalent saturation temperature is in the hanging down zone, in step S7, the control unit 40 causes the upper limit fan taps of the indoor fans 52 and 52 to hang down by one tap, and then performs the determination of step S8. When the high-pressure equivalent saturation temperature is in the non-change zone, the control unit 40 performs the determination of step S8 as it is. When the high-pressure equivalent saturation temperature is in the up zone, the upper limit fan taps are increased by one tap, and then the control unit 40 performs the determination of step S8.

According to the determination method shown in FIG. 5, the control unit 40 performs the determination as follows: when the high-pressure equivalent saturation temperature is increasing, the high-pressure equivalent saturation temperature is in the hanging down zone until becoming Tp2 or more, the high-pressure equivalent saturation temperature is in the non-change zone when being Tp2 or more and less than Tp3, and the high-pressure equivalent saturation temperature is in the up zone when being Tp3 or more. When the high-pressure equivalent saturation temperature is decreasing, the high-pressure equivalent saturation temperature is in the up zone until becoming Tp2 or less, the high-pressure equivalent saturation temperature is in the non-change zone until becoming Tp1 or less, and the high-pressure equivalent saturation temperature is in the hanging down zone when being Tp1 or less. Tp2 is, for example, several degrees higher than Tp1, and Tp3 is, for example, several degrees higher than Tp2.

(5-4) Modification D

In the above embodiment, as described in (4-3-1-1), through the change of the target degree of subcooling SCm of the indoor unit in the high-temperature air room by the subcooling control, the control of the first expansion valve is changed so that the temperature of the refrigerant that flows through the first utilization-side heat exchanger increases. Alternatively, a configuration may be provided such that through correction of the opening degree of the first expansion valve of the indoor unit in the high-temperature air room, the temperature of the refrigerant that flows through the first utilization-side heat exchanger can increase. For example, the opening degree of the first expansion valve of the indoor unit in the high-temperature air room may be fixed to a predetermined valve opening degree. Therefore, the control of the first expansion valve for increasing the temperature of the refrigerant that flows through the first utilization-side heat exchanger is not limited to the change of the target degree of subcooling SCm.

(5-5) Modification E

In the above embodiment, the case of controlling the target discharge pipe temperature for indirectly controlling the degree of superheating on the inlet side of the compressor 36 has been described as an example. However, the technique of the present disclosure can also be applied to an air conditioner that directly controls the degree of superheating on the inlet side.

(5-6) Modification F

In the above embodiment, the case has been described where the control unit 40 performs control through interpretation and execution of an executable program and data stored in the memory by the CPU. The program and data may be introduced into the memory via a recording medium, or may be directly executed from the recording medium, for example. In addition, for example, the program and data may be introduced from the recording medium into the memory via a telephone line, a conveyance path, or the like. Alternatively, the control unit 40 may be configured using an integrated circuit (IC) capable of performing the same control as that performed using the CPU and memory. The IC mentioned here includes a large-scale integrated circuit (LSI), an application-specific integrated circuit (ASIC), a gate array, a field programmable gate array (FPGA), and the like.

(6) Features

In the following description of features, for easy understanding, an example is given in which the indoor unit 11 has received the request for high-temperature air from the remote controller 111 and the indoor units 12 to 14 have not received the request for high-temperature air. Further, the following features will be described on the assumption that, among the indoor units 12 to 14 that have not received the request for high-temperature air, the indoor unit 12 is in the on-state of operation and the indoor units 13 and 14 are in the off-state of operation.

(6-1)

When the air conditioner 1 is in the state of the example set as described above, the indoor heat exchanger 21 of the indoor unit 11 in the high-temperature air room is the first utilization-side heat exchanger, and the expansion valve 31 is the first expansion valve. When controlling the high-temperature air, the control unit 40 changes the control of the expansion valve 31 to increase the temperature of the refrigerant that flows through the indoor heat exchanger 21, for example, to widen the superheated area as shown in FIG. 3B, thereby increasing the average temperature of the refrigerant that flows through the indoor heat exchanger 21 (average temperature of the indoor heat exchanger). As a result, a larger amount of heat than that of heat during the normal heating operation can be given to the hot air blown out after heat exchange in the indoor heat exchanger 21, and thus the temperature of the hot air blown out from the indoor unit 11 that has received the request for high-temperature air can be sufficiently increased.

(6-2)

In the example set as described above, the target degree of subcooling SCmH of the indoor unit 11 lowered by the control unit 40 in response to the request for high-temperature air increases the superheated area of the indoor heat exchanger 21 as the first utilization-side heat exchanger 121 shown in FIG. 3B. The superheated area occupied by the high-temperature gas refrigerant in the indoor heat exchanger 21 can be increased, and the amount of heat received by the air that passes through the indoor heat exchanger 21 is increased so that the temperature of the hot air blown out by the indoor unit 11 can be sufficiently increased.

(6-3)

In the example set as described above, as described in the above (4-3-3), the control unit 40 changes the turn-off conditions of the indoor units 12 to 14 of the refrigerant paths r2 to r4 so that the indoor units 12 to 14 can easily enter in the off-state of operation, the indoor units 12 to 14 being connected to the refrigerant paths r2 to r4 for which the request for high-temperature air has not been made (example of the second refrigerant path for which the request for high-temperature air has not been made). Since the indoor unit 12 is in the ton-state of operation and the indoor units 13 and 14 are in the off-state of operation, the turn-off condition for the indoor unit 12 only may be changed, for example. However, if the indoor units 13 and 14 enter the off-state of operation during the heating operation, when the indoor temperatures Tr3 and Tr4 are lowered, to turn off the indoor units 13 and 14 is expected to be eventually performed. Therefore, if the turn-off conditions of the indoor units 13 and 14 that are in the off-state of operation are changed so that to turn off the indoor units 13 and 14 is easily performed, to turn off the indoor units 13 and 14 can be performed in a short period when the indoor units 13 and 14 tern on later. As described above, when the period during which the heating operation using the refrigerant paths r2 to r4 enters the off-state of operation increases and the refrigerant easily accumulates in the refrigerant paths r2 to r4, even if the subcooled area decreases and the superheated area increases in the indoor heat exchanger 21 of the refrigerant path r1, the refrigerant of the air conditioner 1 can be appropriately distributed, and the air conditioner 1 can maintain an efficient operation state.

(6-4)

In the example set as described above, when the flow rate of the refrigerant that flows through the indoor heat exchanger 21 is increased through an increase of the number of rotations of the compressor 36 in the high-temperature air control, along with an increase in the temperature of the refrigerant that flows through the indoor heat exchanger 21 through a change of the control of the expansion valve 31, a larger amount of heat can be given from the refrigerant to the air that passes through the indoor heat exchanger 21.

(6-5)

In the example set as described above, in the high-temperature air control, increasing the number of rotations of the outdoor fan 39 that is a heat source-side fan promotes the heat exchange in the outdoor heat exchanger 35 that is the heat source-side heat exchanger, and increases the evaporating capacity. As a result, the condensing capacity in the indoor heat exchanger 21 increases, and thus the temperature of the hot air blown out through the indoor heat exchanger 21 can be increased.

(6-6)

In the example set as described above, when the request for high-temperature air is received, the airflow volume of the indoor fan 51 that is the first utilization-side fan is set to a predetermined value or less. As a result, as compared to a case where the airflow volume exceeds the predetermined value, the amount of air that passes through the indoor heat exchanger 21 that is the first utilization-side heat exchanger per unit time decreases, and the amount of heat received by the air per unit volume increases.

(6-7)

In the configuration of the above embodiment, when the high-temperature air request operation buttons of the remote controllers 111 to 114 are operated, the remote controllers 111 to 114 can transmit the request for high-temperature air and the control unit 40 can receive the request for high-temperature air. Therefore, the user can use the remote controllers 111 to 114 to give an instruction to control the high-temperature air as needed.

(6-8)

In the example set as described above, the control unit 40 automatically changes, to the maximum value, the set temperature Ts1 of the indoor unit 11 installed in the room to be air-conditioned to which the hot air is blown out from the indoor heat exchanger 21. As a result, although the indoor temperature Tr1 of the space to be air-conditioned easily increases through the increase of the temperature of the hot air in response to the request for high-temperature air, as compared to the case where the set temperature Ts1 is not changed, the heating operation of the indoor unit 11 in the high-temperature air room using the refrigerant path r1 cannot easily enter the off-state of operation. As a result, comfort can be ensured through suppression of an increase in the number of times the hot air from the indoor heat exchanger 21 stops due to the request for high-temperature air.

(6-9)

In the example set as described above, as described in Modification D, when the request for high-temperature air is received, if the opening degree of the expansion valve 31 that is the first expansion valve is corrected so that the temperature of the refrigerant that flows through the indoor heat exchanger 21 that is the first utilization-side heat exchanger increases, a large amount of heat can be given to the hot air from the refrigerant in the indoor heat exchanger 21 whose temperature has increased through the correction of the valve opening degree.

(6-10)

In the example set as described above, the control unit 40 uses the fact that the heating operation of the indoor units 13 and 14 using the refrigerant paths r3 and r4 for which the request for high-temperature air has not been made is in the off-state of operation so as to control the expansion valves 33 and 34 that are the second expansion valves in such a manner that the refrigerant is stored in the indoor heat exchangers 23 and 24 that are the second utilization-side heat exchangers. As a result, an excess refrigerant generated for increasing the temperature of the refrigerant that flows through the indoor heat exchanger 21 can be appropriately distributed, and the temperature of the refrigerant sucked into the compressor 36 can be easily controlled to be an efficient temperature.

(6-11)

In the example set as described above, as a specific example of the description of (6-10) above, the control unit 40 controls the expansion valves 33 and 34 through target discharge pipe control. As a result, the control unit 40 controls the opening degrees of the expansion valves 33 and 34 so as to bring the temperature of the refrigerant sucked into the compressor 36 or the refrigerant discharged from the compressor 36 close to the target temperature when the heating operation using the refrigerant paths r3, r4 that are the second refrigerant paths is in the off-state of operation.

As described with reference to FIG. 3D, through such control, the refrigerant can be stored in the indoor heat exchangers 23 and 24.

(6-12)

In the example set as described above, when the heating operation using the refrigerant paths r3 and r4 that are the second refrigerant paths is in the off-state of operation, in a case where the control unit 40 is configured not to shift to the protection control even if the indoor heat-exchange temperature sensors 93 and 94 that are the intermediate temperature sensors detect that the refrigerant has been subcooled, the heating operation can be continued while the liquid refrigerant is kept being stored even after the indoor heat-exchange temperature sensors 93 and 94 detect that the refrigerant has been subcooled. Therefore, a large amount of liquid refrigerant can be stored in the indoor heat exchangers 23 and 24 that are the second utilization-side heat exchangers in which the heating operation is in the off-state of operation. As a result, the superheated area occupied by the gas refrigerant in the indoor heat exchanger 21 that is the first utilization-side heat exchanger can be easily expanded.

While the embodiments of the present disclosure have been described above, it will be understood that various changes in form and details can be made without departing from the purpose and scope of the present disclosure as set forth in the claims.

REFERENCE SIGN LIST

1 Air conditioner
2 Refrigerant circuit
11 to 14 Indoor unit
21 to 24 Indoor heat exchanger
31 to 34 Expansion valve
35 Outdoor heat exchanger (example of heat source-side heat exchanger)
36 Compressor
39 Outdoor fan (example of heat source-side fan)
40 Control unit
51 to 54 Indoor fan
91 to 94 Indoor heat-exchange temperature sensor
111 to 114 Remote controller
121 First utilization-side heat exchanger
122 Second utilization-side heat exchanger
131 First expansion valve
132 Second expansion valve
151 First utilization-side fan
152 Second utilization-side fan
201 First utilization-side unit
202 Second utilization-side unit

CITATION LIST

Patent Literature

[Patent Literature 1] JP H4-4645 U

The invention claimed is:

1. An air conditioner comprising:
a refrigerant circuit that has a first refrigerant path to which a compressor, a first utilization-side heat exchanger, a first expansion valve, and a heat source-side heat exchanger are connected in order; and
a control unit that controls the compressor and the first expansion valve,
wherein the control unit changes control of the first expansion valve such that a temperature of a refrigerant that flows through the first utilization-side heat exchanger increases so as to increase an average temperature of the first utilization-side heat exchanger when receiving a request for high-temperature air that temporarily increases a temperature of hot air blown out through the first utilization-side heat exchanger,
wherein the refrigerant circuit further includes at least one second refrigerant path to which the compressor, a second utilization-side heat exchanger, a second expansion valve controlled by the control unit, and the heat source-side heat exchanger are connected in order, and
when receiving the request for high-temperature air, the control unit changes the turn-off condition of the heating operation of the second refrigerant path, which is not required for the high-temperature air, so that the heating operation does not turn off before the change of the turn-off condition but turns off after the change of the turn-off condition in a predetermined state.

2. The air conditioner according to claim 1,
wherein, when receiving the request for high-temperature air, the control unit performs control for lowering a target degree of subcooling so as to increase a superheated area occupied by a gas refrigerant in the first utilization-side heat exchanger.

3. An air conditioner comprising:
a refrigerant circuit that has a first refrigerant path to which a compressor, a first utilization-side heat exchanger, a first expansion valve, and a heat source-side heat exchanger are connected in order; and
a control unit that controls the compressor and the first expansion valve,
wherein the control unit changes control of the first expansion valve such that a temperature of a refrigerant that flows through the first utilization-side heat exchanger increases when receiving a request for high-temperature air that temporarily increases a temperature of hot air blown out through the first utilization-side heat exchanger,
wherein the refrigerant circuit further includes at least one second refrigerant path to which the compressor, a second utilization-side heat exchanger, a second expansion valve controlled by the control unit, and the heat source-side heat exchanger are connected in order, and
when receiving the request for high-temperature air, the control unit changes a turn-off condition of a heating operation of the second refrigerant path such that a difference between a set temperature and an indoor temperature, which is a condition for turning off the heating operation of the second refrigerant path for which the request for high-temperature air has not been made, is reduced or set to 0.

4. The air conditioner according to claim 1,
wherein, when receiving the request for high-temperature air, the control unit performs control for increasing a flow rate of the refrigerant that flows through the first utilization-side heat exchanger by increasing the number of rotations of the compressor.

5. The air conditioner according to claim 1, further comprising a heat source-side fan that is controlled by the control unit and generates an air flow that passes through the heat source-side heat exchanger,
wherein, when receiving the request for high-temperature air, the control unit increases the number of rotations of the heat source-side fan.

6. The air conditioner according to claim 1, further comprising a first utilization-side fan that is controlled by the control unit and generates an air flow that passes through the first utilization-side heat exchanger and is blown out as hot air, wherein, when receiving the request for high-temperature air, the control unit performs control for bringing an airflow volume of the first utilization-side fan to a predetermined value or less.

7. The air conditioner according to claim 1, further comprising a remote controller that is used when sending the request for high-temperature air to the control unit, wherein the control unit is configured to receive the request for high-temperature air from the remote controller.

8. The air conditioner according to claim 1, wherein, when receiving the request for high-temperature air, the control unit performs control for changing, to a maximum value, a set temperature of a room to be air-conditioned to which hot air is blown out from the first utilization-side heat exchanger.

9. The air conditioner according to claim 1, wherein, when receiving the request for high-temperature air, the control unit performs control for correcting an opening degree of the first expansion valve such that the temperature of the refrigerant that flows through the first utilization-side heat exchanger increases.

\* \* \* \* \*